United States Patent [19]
Nakamura et al.

[11] Patent Number: 5,585,710
[45] Date of Patent: Dec. 17, 1996

[54] SECONDARY BATTERY DEVICE WITH SPACER FOR THERMISTORS AND TERMINALS AND CHARGING APPARATUS THEREFOR

[75] Inventors: Shoichi Nakamura; Daisuke Terakado, both of Tokyo, Japan

[73] Assignee: Sony Corporation, Japan

[21] Appl. No.: 300,221

[22] Filed: Sep. 6, 1994

[30] Foreign Application Priority Data

Sep. 13, 1993 [JP] Japan ................................. 5-251085

[51] Int. Cl.⁶ ............................................ H01M 10/46
[52] U.S. Cl. ................................................ 320/15; 320/35
[58] Field of Search ........................... 320/2, 6, 15, 17, 320/35, 36, 39

[56] References Cited

U.S. PATENT DOCUMENTS

| | | | |
|---|---|---|---|
| 4,234,839 | 11/1980 | King et al. | 320/36 |
| 4,455,523 | 6/1984 | Koenck | 320/3 J X |
| 4,622,509 | 11/1986 | Spruijt | 320/36 |
| 5,248,927 | 9/1993 | Takei et al. | 320/2 |

FOREIGN PATENT DOCUMENTS

| | | |
|---|---|---|
| 0539640 | 5/1993 | European Pat. Off. . |
| 0593869 | 4/1994 | European Pat. Off. . |
| 2173962 | 10/1986 | United Kingdom . |

OTHER PUBLICATIONS

UK Search report, 20 Oct. 1994.

*Primary Examiner*—Edward H. Tso
*Attorney, Agent, or Firm*—Ronald P. Kananen

[57] ABSTRACT

A secondary battery device charging apparatus includes a number of first terminals, a pair of second terminals, a power supply circuit, a switching element and a control circuit. The secondary battery device includes an even number of secondary batteries arranged with electrodes facing in mutually opposite directions, a middle spacer set up between the secondary batteries, a thermistor set up at the middle spacer so as to be thermally in contact with the secondary batteries, a pair of electrodes set up at the middle spacer and a uniting member for uniting the secondary batteries together into a single item. The pair of electrodes are arranged symmetrically with respect to the mechanical center of the secondary batteries and the thermistor is connected to the pair of electrodes. When the secondary battery device is installed, the number of first terminals come into contact with each of their corresponding second battery electrodes. When the secondary battery charging device is installed, the switching element is turned on by the control circuit so that a charging current from the power supply circuit is supplied via the two first terminals which are positioned at the beginning and the end of the number of first terminals so as to charge the secondary batteries. At the time of charging, the temperature of the secondary batteries is detected from the voltage for the pair of second terminals so that when the detected temperature is not a suitable temperature for passing a current through the secondary batteries, the switching element is turned off and charging is halted.

27 Claims, 9 Drawing Sheets

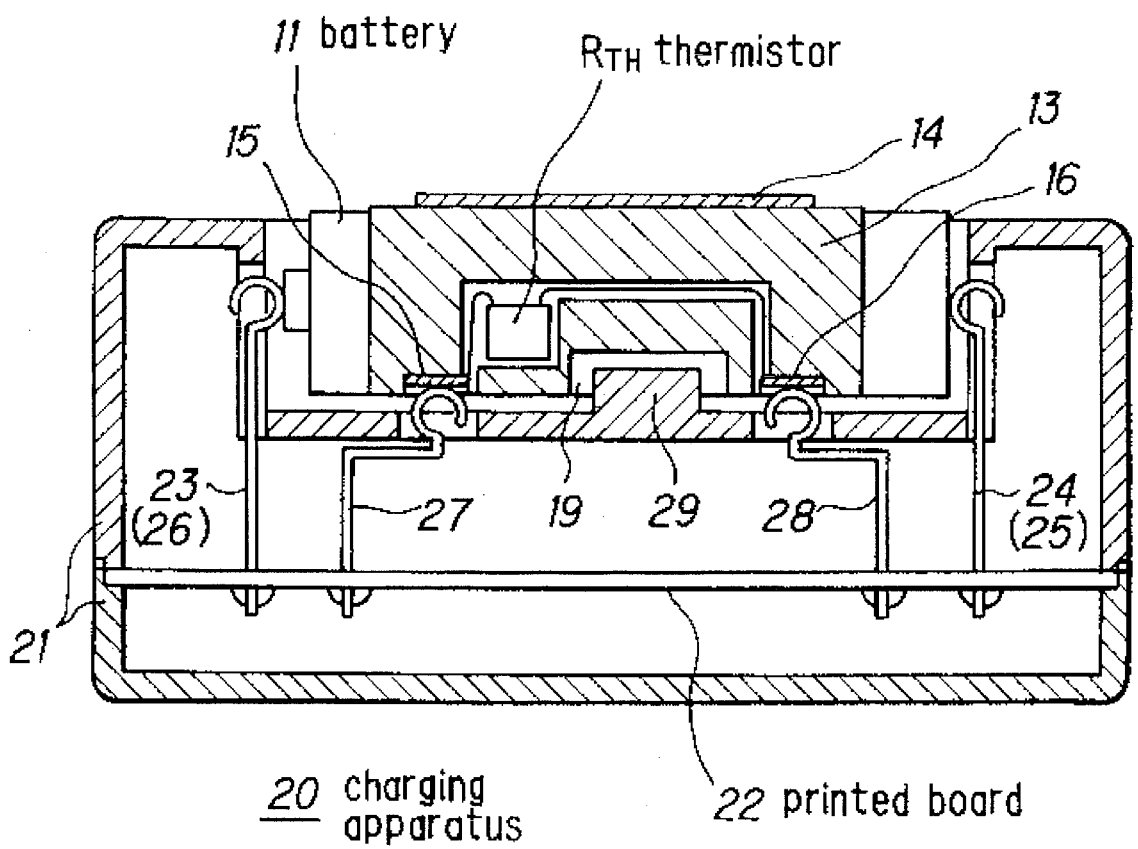

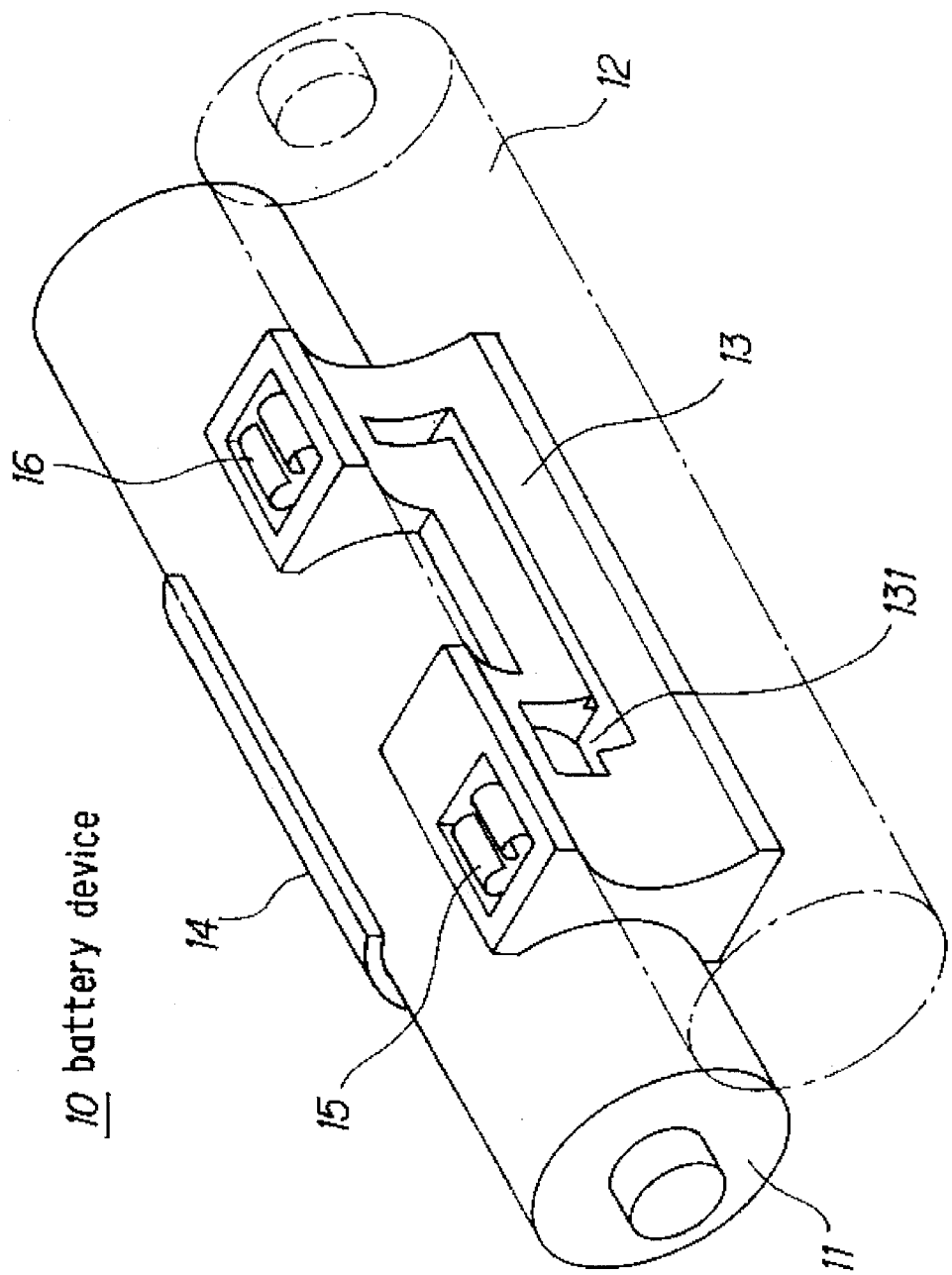

5,585,710

SECONDARY BATTERY DEVICE WITH SPACER FOR THERMISTORS AND TERMINALS AND CHARGING APPARATUS THEREFOR

BACKGROUND

1. Field of the Invention

The present invention relates to a secondary battery device and charging apparatus. More particularly, the present invention relates to a secondary battery device equipped with an even number of secondary batteries and one or more temperature detecting elements and its associated charging apparatus.

2. Background of the Invention

Ni-Cd (Nickel Cadmium) and Ni-MH (Nickel Hydrogen) batteries are well known as secondary batteries. One particular aspect which is well known is that the voltage for Ni-MH batteries is 1.2 V, which is the same as for Ni-Cd batteries, but Ni-Cd batteries have only half the capacity of Ni-MH batteries. Ni-MH batteries are also capable of rapid charging and large current discharge.

The performance of Ni-MH batteries is weakened if they reach a high temperature during charging, i.e. if the temperature of the external wall becomes greater than 66° C., for example.

It follows that if a Ni-MH battery generates heat and reaches a high temperature during charging due to abnormalities in the charging apparatus and so forth, it is necessary to halt the charging. Also, in the case where the batteries have reached a high temperature before the start of charging due to neglect inside a car in direct sunlight in the summer, it is necessary to halt charging directly after the start or not to start charging at all.

With equipment such as compact stereo headphone cassette tape players and so forth, where the power consumption is quite small, just one Ni-MH battery is sufficient for operation. However, with equipment such as portable telephones and cameras with built-in VCRs, the power consumption is comparatively high and it therefore becomes necessary to use two or more Ni-MH batteries connected together in series.

SUMMARY OF THE INVENTION

It is, therefore, an object of the present invention to provide a secondary battery device which resolves the aforementioned problems.

It is another object of the present invention to provide a secondary battery device charging apparatus which resolves the aforementioned problems.

It is a further object of the present invention to provide a Nickel-Hydrogen battery device charging apparatus which resolves the aforementioned problems.

According to the present invention, there is provided a secondary battery device which includes an even number of secondary batteries, a middle spacer, a thermistor, a pair of electrodes and a uniting member. The even number of secondary batteries are arranged with their electrodes facing in mutually opposite directions. The middle spacer is set up between the secondary batteries. The thermistor is set up at the spacer so as to be thermally in contact with the secondary batteries. The pair of electrodes are set up at the middle spacer. The uniting means is for uniting the secondary batteries together into a single item. The pair of electrodes is arranged symmetrically about the mechanical center of the secondary batteries and the thermistor is connected to the pair of electrodes.

According to the present invention, there is provided a secondary battery device charging apparatus which includes a number of first terminals, a pair of second terminals, a power supply circuit, a switching element and a control circuit. The secondary battery device includes an even number of secondary batteries arranged with electrodes facing in mutually opposite directions, a middle spacer set up between the secondary batteries, a thermistor set up at the middle spacer so as to be thermally in contact with the secondary batteries, a pair of electrodes set up at the middle spacer, and a uniting member for uniting the secondary batteries together into a single item. The pair of electrodes are arranged symmetrically with respect to the mechanical center of the secondary batteries and the thermistor is connected to the pair of electrodes. When the secondary battery device is installed, the number of first terminals come into contact with each of their corresponding second battery electrodes. When the secondary battery is installed, the pair of second terminals connect with the pair of electrodes. The power supply circuit supplies a charging current to the secondary batteries. The switching element controls the supplying of the charging current outputted from the power supply circuit. The control circuit, to which the output signal from the thermistor is provided, controls the switching element. When the secondary battery charging device is installed, the switching element is turned on by the control circuit so that a charging current from the power supply circuit is supplied via the two first terminals which are positioned at the beginning and the end of the number of first terminals so as to charge the secondary batteries. At the time of charging, the temperature of the secondary batteries is detected from the voltage for the pair of second terminals so that when the detected temperature is not a suitable temperature for passing a current through the secondary batteries, the switching element is turned off and charging is halted.

According to the present invention, there is provided a secondary battery device including an even number of secondary batteries, a uniting unit, a temperature detecting element and a pair of detecting electrodes. The even number of secondary batteries are arranged with their electrodes facing in mutually opposite directions so as to be symmetrical with respect to the center of the device. The uniting unit is for uniting the secondary batteries together into a single item. The temperature detecting element is set up at the uniting unit so as to be thermally connected to the secondary batteries. The pair of detecting electrodes are set up at the uniting unit. The pair of detecting electrodes are arranged symmetrically about the mechanical center of the secondary batteries and the temperature detecting element is connected to the detecting electrodes.

According to the present invention, there is provided a Nickel-Hydrogen battery device charging apparatus which includes a charging unit, a number of first terminals, a pair of second terminals and a control unit. The nickel hydrogen battery device has an even number of Nickel-Hydrogen batteries, a uniting unit for uniting the Nickel-Hydrogen batteries so that the electrodes for pairs of the Nickel-Hydrogen batteries face in mutually opposite directions, a temperature detecting element set up at the uniting part so as to be thermally connected to the Nickel-Hydrogen batteries and a pair of detecting electrodes set up at the temperature detecting means so as to be connected with the temperature detecting element. The charging unit is for charging the installed Nickel-Hydrogen battery device. The number of first terminals are for connecting the installed number of Nickel-Hydrogen batteries together in series, with the two first terminals positioned at the beginning and the end of the plurality of first terminals providing the charging current from the charging unit. The pair of second terminals are connected to the pair of detecting electrodes for the installed Nickel-Cadmium battery device. The control unit is for controlling the operation of the charging unit. During charging, the detection signal from the temperature detecting element is provided to the control unit via the pair of second terminals and the control unit only charges the Nickel-Hydrogen cells using the charging unit when the detection signal indicates that charging is possible.

According to the secondary battery device for the present invention, by putting an even number of secondary batteries together in a single unit, this unit can be used with electronic equipment which consumes a comparatively large amount of electrical power. Also, as the secondary battery device for the present invention has its detection electrodes arranged symmetrically about the mechanical center of the secondary batteries, consideration does not have to be given to the orientation of the secondary battery device when it is installed in the secondary battery device charging apparatus.

According to the charging apparatus in the present invention, the temperature of the secondary batteries is detected using a temperature detecting element which is thermally connected to the secondary batteries. The charging operation may then be halted based on the detection results from the temperature detecting elements. In this way, deterioration of the secondary batteries is prevented.

BRIEF DESCRIPTION OF THE DRAWINGS

FIG. 6A is a cross-sectional view taken along line A—A of FIG. 5, FIG. 6B is a cross-sectional view taken along line B—B of FIG. 5, FIG. 6C is a cross-sectional view taken along line C—C of FIG. 5, and FIG. 6D is a cross-sectional view taken along line D—D of FIG. 5;

FIG. 7 is a cross-sectional view showing the structure of the charging apparatus for the first embodiment;

FIG. 11 is a perspective view showing the structure of a secondary battery device for a second embodiment of the present invention;

FIG. 12A is a perspective view of the structure of a detecting electrodes, FIG. 12B is a perspective view of the structure of a terminal and FIG. 12C is a perspective view of a further example of a terminal;

DESCRIPTION OF THE INVENTION

First embodiment

Figure 1:
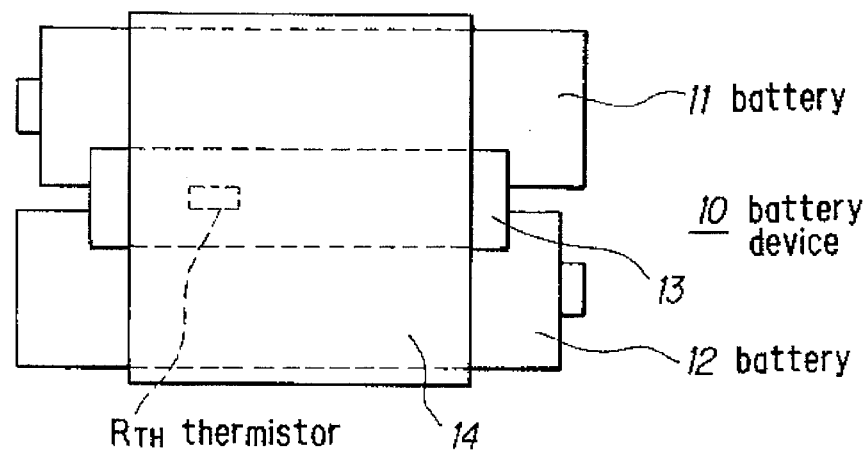
FIG. 1 is a top view of the structure of a secondary battery device according to a first embodiment of the present invention.
Figure 2:
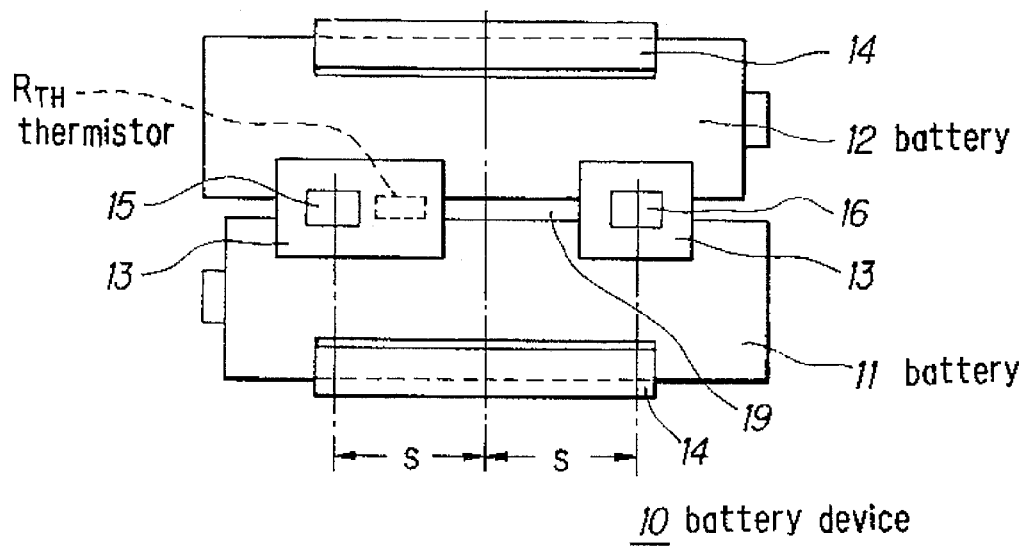
FIG. 2 is a bottom view of the structure of a secondary battery device according to the first embodiment.
Figure 3:
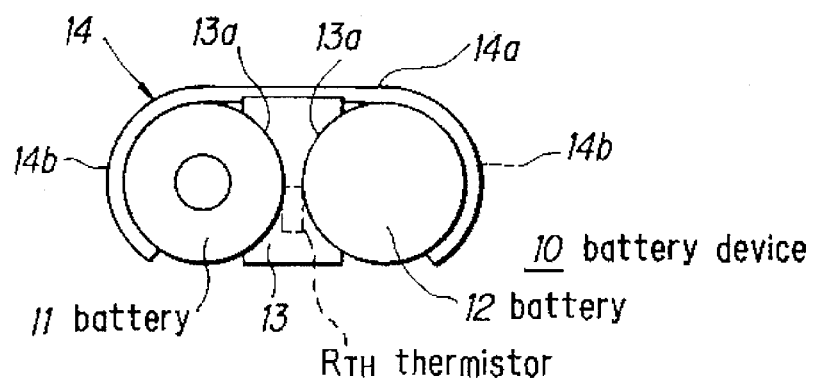
FIG. 3 is a side view of the structure of a secondary battery device according to the first embodiment.

The following is a detailed description with reference to the diagrams of a first embodiment of a secondary battery device and its associated charging apparatus for the present invention. FIGS. 1 to 3 show an example of a secondary battery device according to this first embodiment of the invention. FIG. 1 is a plan view from above, FIG. 2 is a plan view from below and FIG. 3 is a plan view from the side.

This battery device 10 consists of, for example, two 3-cell Ni-MH batteries 11 and 12 having the same shape. These batteries 11 and 12 are arranged parallel to each other so as to be facing in opposite directions, so that the positive electrode for the battery 11 and the negative electrode for the battery 12 are in the same plane, as are the negative electrode for the battery 11 and the positive electrode for the battery 12.

A middle spacer 13, to be described later, is set up between the batteries 11 and 12 and a uniting member 14 is set up at the periphery of the batteries 11 and 12. This uniting member 14 is formed in a belt shape so as to have the cross-sectional shape of the letter c using a composite resin which is both heat resistant and resilient. This uniting member 14 consists of a flat part 14a to which the middle spacer to be described later is attached, and a pair of C-shaped supporting arms 14b and 14b coming from each end of this flat part 14a with all of these parts being formed as a single item. The outer peripheries of the batteries 11 and 12 are encompassed by the uniting member 14 so as to be clamped in the form of the arrangement described previously. The open side of the uniting member 14 is positioned so as to be at the lower side of the battery device 10.

Figure 4:
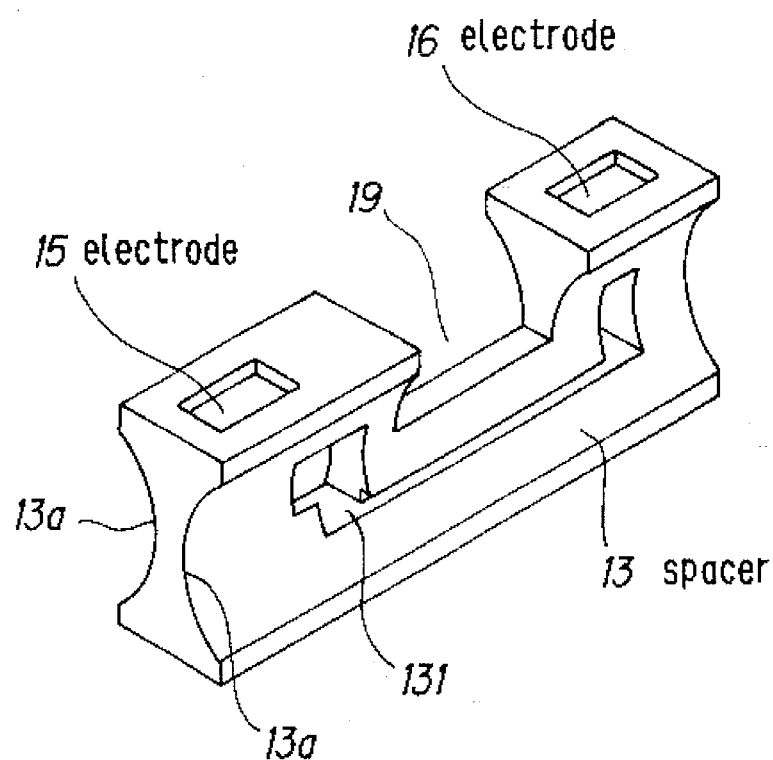
FIG. 4 is a perspective view showing the structure of the middle spacer.
Figure 5:
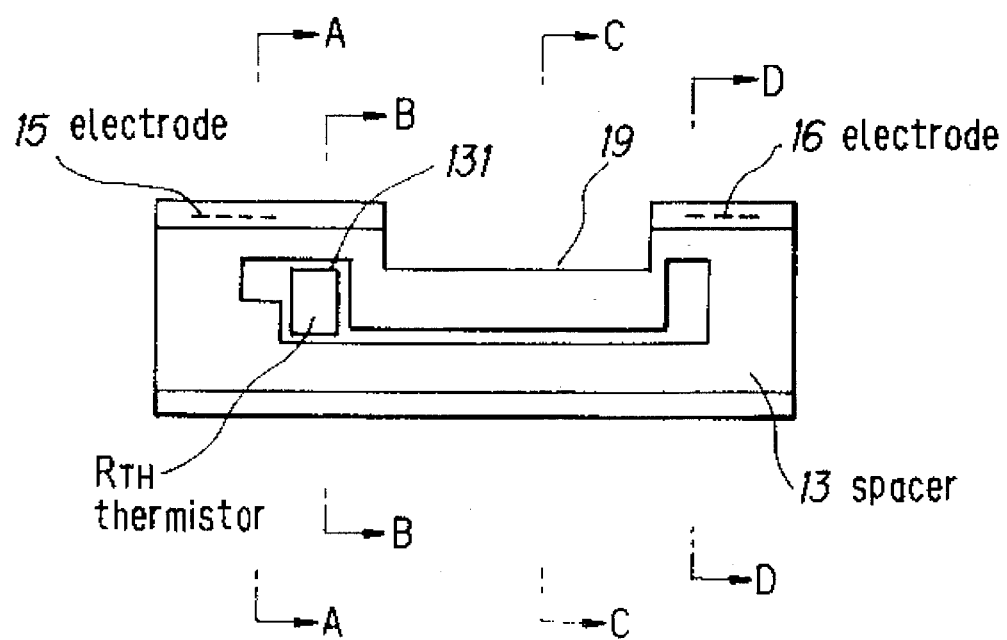
FIG. 5 is an side view showing the structure of the middle spacer.
Figure 6A:
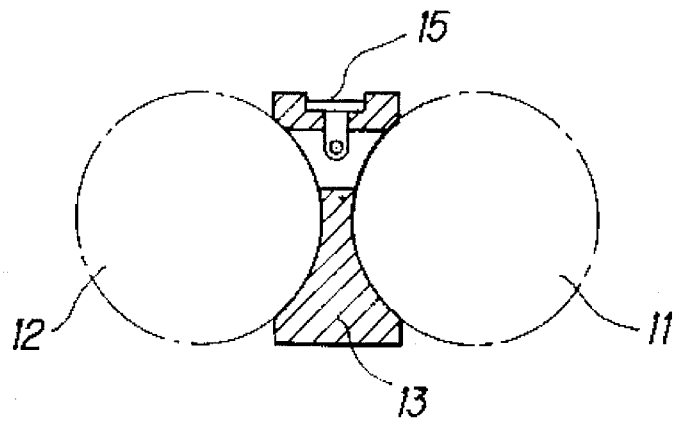
FIGS. 6A to 6D are cross-sectional views of the structure of the middle spacer where
Figure 6B:
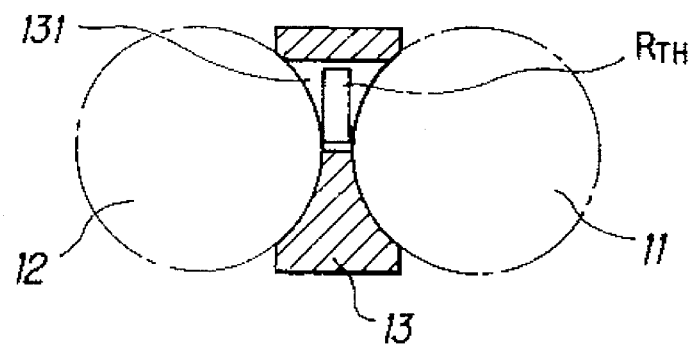
Figure 6C:
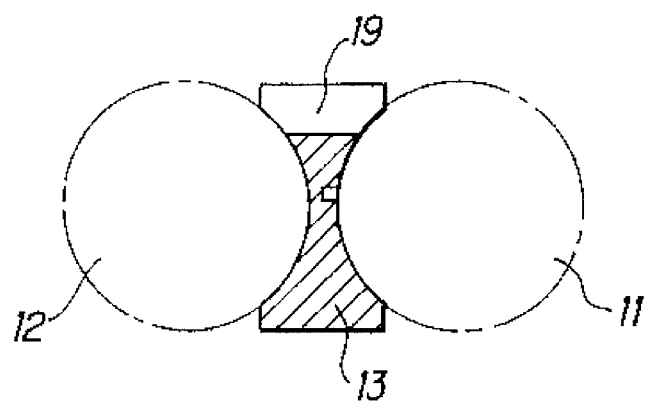
Figure 6D:
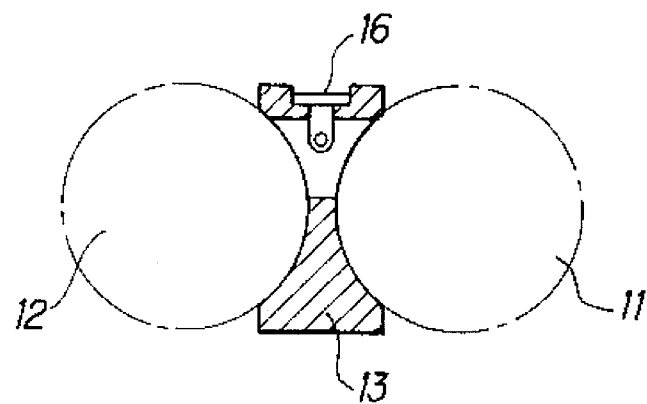

The middle spacer 13 is, for example, of the construction shown in FIGS. 4, 5 and 6A to 6D. Here, FIG. 4 is a perspective view of the lower side, FIG. 5 is a side view along the direction in which the batteries 11 and 12 are arranged, and FIGS. 6A to 6D show cross-sectional views taken along line A—A, B—B, C—C, and D—D of FIG. 5.

Also, engaging concave parts 13a and 13a are formed at the spacer 13, which is made entirely from a heat resistant composite resin as shown in FIG. 3 and FIGS. 6A to 6D. When then looking from the end surface side i.e. the terminal side, the outer walls of the batteries 11 and 12 come into contact with the engaging concave parts 13a and 13a of the spacer 13 so as to be restricted at the center. The spacer 13, as shown in FIGS. 4 and 5, is formed so as to have a concave center so as to appear as a cross-sectional C-shape when viewed along the direction in which the batteries 11 and 12 are arranged and is of a height which is slightly less than the diameter of the batteries 11 and 12. The spacer 13 will therefore prevent the batteries 11 and 12 from becoming twisted by ensuring that they are clamped in position by the uniting member 14.

There is also a through hole 131 formed in the spacer along the direction along which the batteries 11 and 12 are arranged and a thermistor RTH is set up at this through hole 131. A pair of detecting electrodes (contact points) 15 and 16 are also set up on the lower side of the of the spacer 13 to which the thermistor RTH is connected.

The thermistor RTH is a temperature detecting element for detecting the temperature of the batteries 11 and 12. As shown in FIGS. 6A to 6D, it is thermally in contact with these batteries 11 and 12, i.e., the thermistor RTH is arranged so as to come into contact with the external walls of the batteries 11 and 12. Also, the detecting electrodes 15 and 16 are positioned at equal distances S from the lengthwise center of the batteries 11 and 12, as shown in FIG. 2, i.e., the detecting electrodes 15 and 16 fall within the plane which includes the batteries 11 and 12 and are positioned symmetrically about the center of the arrangement of the batteries 11 and 12.

The above describes the construction of the battery device 10. The following describes the construction of the charging apparatus 20 for the battery device 10.

FIG. 7 is a cross-sectional drawing of an example of this charging apparatus 20. A printed circuit board 22 is set up within a case 21 for the charging apparatus 20 and a charging circuit, to be described later, is set up at this board 22.

Further, terminals 23 to 26 are planted in the board 22 so as to come resiliently into contact with the positive and negative electrodes of the battery 11 (or 12) and the positive and negative electrodes of the battery 12 (or 11) when the charging apparatus 20 is installed in the battery device 10. Terminals 27 and 28 are also planted so as to come resiliently into contact with terminals 15 and 16 (or 16 and 15). In the example in FIG. 7, the leading end of a conductively plated piano wire is bent over into a p-shaped structure and the other end of the wire is fixed to the substrate 22 using solder.

Also, a convex part 29 is formed in the case 21 so as to be positioned opposite the concave part 19 in the center of the lower surface of the spacer for the battery device 10.

Figure 8:
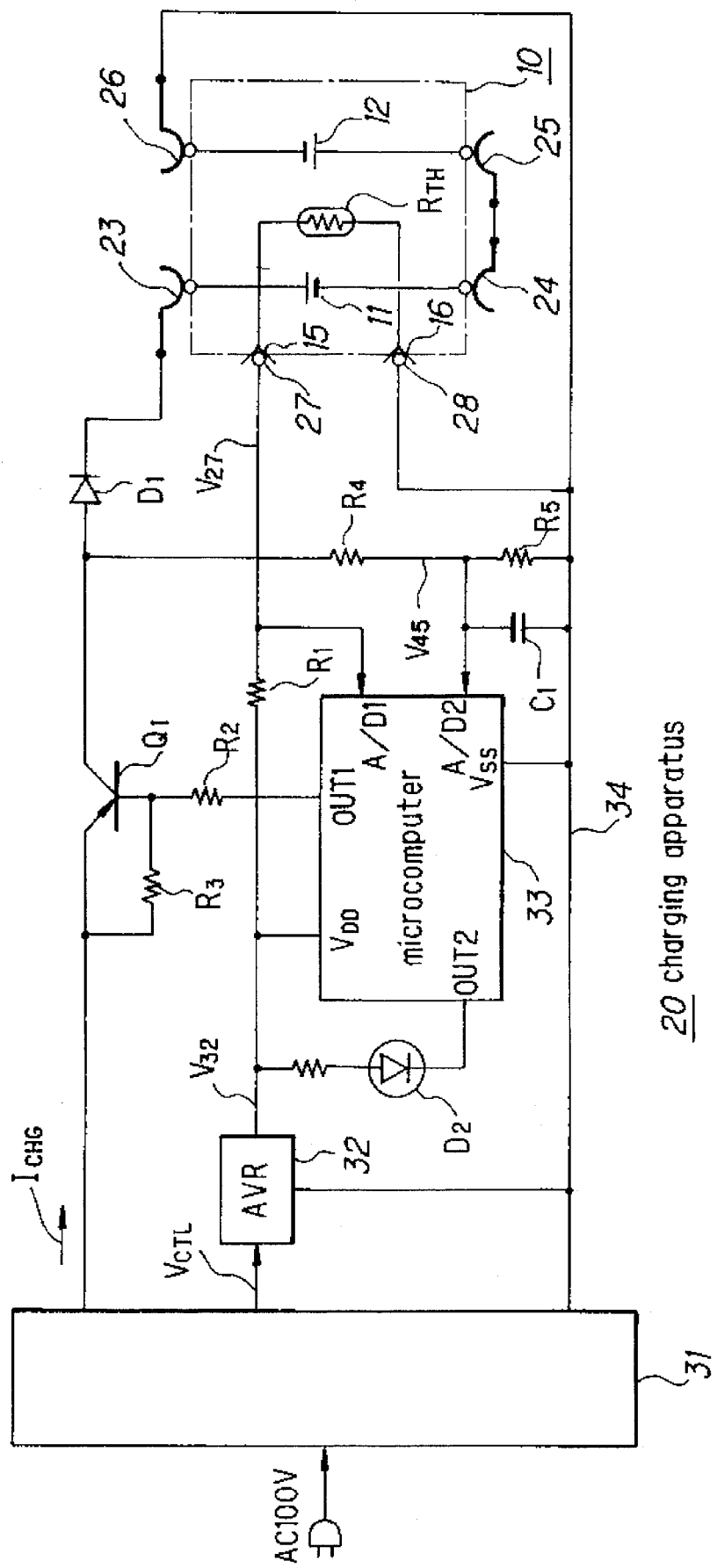
FIG. 8 is a block diagram showing the structure of the charging apparatus.

FIG. 8 is a view of an example of a charging circuit set up on the board 22. A main A.C. voltage is provided to the power supply circuit 31 and this provides a D.C. current ICHG for charging and a D.C. voltage VCTL for use in controlling the current.

In the case in this first embodiment, the battery device 10 is charged by rapid charging. The charging current ICHG is therefore a constant current. The value of the charging current ICHG is therefore taken to be, for example, 1100 mA, as this value is in the order of 1C mA with respect to the capacity of 1C mAh of each of the batteries 11 and 12. The charging voltage when this kind of charging current ICHG is considered is in the region of 2 to 4.6 V.

Also, if the voltage VCTL for control is in the region of 6.5 to 15 V and this voltage VCTL is provided to the three terminal regulator (a fixed voltage circuit integrated onto a single chip) 32, a fixed voltage V32 of, for example, 5 V, will be produced.

The output terminal for the charging current ICHG for the power supply circuit 31 is connected to terminal 23 via the emitter and collector of the transistor Q1 for switching the charging current ICHG on and off and via the diode D1 for prevention of reverse currents. The earth connection side output terminal for the power supply circuit 31 is connected to terminal 26 via the earth connection line 34. The terminal 24 and the terminal 25 are also connected.

A charging control circuit 33 made up from a microcomputer is set up and the voltage V32 is provided to this charging control circuit 33 as an operating voltage. The first output port OUT1 for the charging control circuit 33 is connected to the base of the transistor Q1 via a resistor R2 with a resistor R3 being connected between the base and the emitter. This resistor R3 is to ensure that the transistor Q1 is sufficiently off when this transistor is turned off.

Also, the output terminal for the regulator 32 is connected to the terminal 27 via the resistor R1 and the terminal 28 is connected to the earth connection line 34. The voltage V27 obtained at terminal 27 is sent to the first analog input terminal which is taken to be the input terminal A/D1 of an A/D converter which is built into the charging control circuit 33. Resistors R4 and R5 for dividing the potential are connected in series between the collector of the transistor Q1 and the earth connection line 34. The central point between these points is then connected to the input terminal of a further A/D converter which is built into the charging control circuit 33 which is taken to be the second analog input terminal A/D2 of the charging control circuit 33. A ripple prevention capacitor C1 is also connected in parallel with the resistor R5.

A charge display LED (D2) is connected to the second output port OUT2 of the charging control circuit 33. The thermistor RTH has, for example, the kind of characteristics shown in FIG. 9, so that at 25° C., the thermistor resistance is RTH=R1 (=10 kΩ).

With this kind of construction, the battery device 10 is installed in the charging apparatus 20 when it is to be charged. In this case, it is not necessary to be overly cautious about the orientation of the battery device.

This is to say that the battery device 10 can be installed so that the positive and negative electrodes of the battery 11 come into contact with the terminals 23 and 24 and the positive and negative terminals of the battery 12 come in contact with the terminals 25 and 26, as shown in FIG. 7 and FIG. 8. Alternatively, the battery device 10 may be installed in the reverse of the way shown in FIG. 7 and FIG. 8, so that the positive and negative electrodes for the battery 11 come into contact with the terminals 25 and 26 and the positive and negative terminals for the battery 12 come into contact with the terminals 23 and 24.

The batteries 11 and 12 are arranged so as to be in opposite directions to each other. This means that whichever way around the device 10 is installed, the batteries 11 and 12 are connected in series via the terminals 24 and 25, the positive electrode for these serial batteries is held in contact with the terminal 23 which is on what becomes the beginning side and the negative electrode is held in contact with the terminal 26 which is on what becomes the end side.

Also, as the detecting electrodes 15 and 16 are positioned symmetrically with respect to the center of the arrangement of the batteries 11 and 12, the thermistor RTH is connected between the terminals 27 and 28 whichever way around the battery device 10 is installed.

It follows that when the battery device 10 is installed in the charging apparatus 20, care does not have to be taken regarding the orientation of the battery device 10. Also, as a result of the same freedom, concern does not have to be shown regarding the orientation of the battery device 10 when it is installed in the electronic equipment with which it is to be used.

Further, as the terminal 27 is left open when the battery device 10 is not installed in the charging apparatus 20, the voltage V32 is outputted from terminal 27 almost without modification. At this time, the terminal voltage V27 for the terminal V27 becomes $$V27 \geq 4.5 \ V.$$

When the battery device 10 is installed in the charging apparatus 20, the voltage V32 is divided by the resistor R1 and the thermistor RTH. This divided voltage becomes V27 and as the thermistor resistance is RTH=R1 at normal temperature, the terminal voltage V27 at this time becomes:

$$\begin{aligned} V27 &= V32 \cdot RTH/(R1 + RTH) \\ &= 2.5 \ [V] \end{aligned}$$

As this changing terminal voltage V27 is sent to the first analog input terminal A/D1 of the charging control circuit 33, the charging control circuit 33 can detect whether the battery device 10 is installed in the charging apparatus 20 from the magnitude of the voltage V27.

When the battery device 10 is installed in the charge apparatus 20, the voltage V27 changes. The charging control circuit 33 therefore detects that the battery device 10 has been installed in the charging apparatus 20, changes the output port OUT1 from a "1" level to a "0" level and switches the transistor Q1 from off to on. By doing this, the charge current ICHG is provided to the batteries 11 and 12 via the path: power supply circuit 31→transistor Q1→diode D1→beginning side terminal 23→battery 11 (or 12)→terminal 24→terminal 25→battery 12 (or 11)→end side terminal 26→earth connection line 34→line for power supply 31. The batteries 11 and 12 are then rapidly charged by a fixed current of a magnitude of 1 CmA.

Also, during rapid charging, the port OUT2 of the charging control circuit 33 is at a "0" level and the LED (D2) is illuminated, so that an indication is given that charging is in progress.

Figure 10:
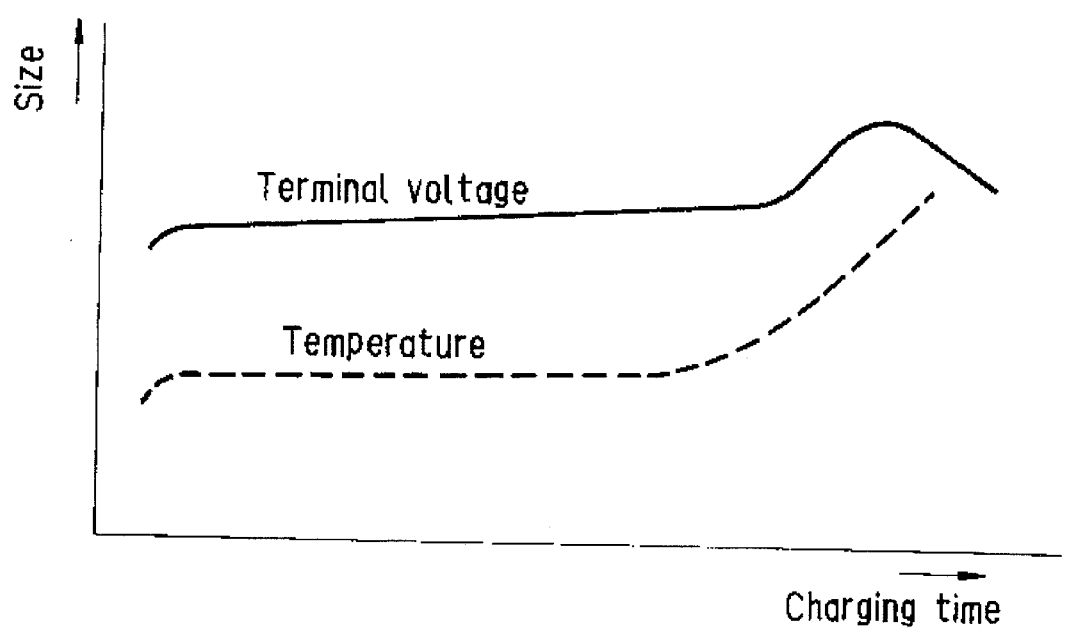
FIG. 10 is a characteristics diagram showing the charging characteristics of the charging apparatus.

So, as shown by the solid line in FIG. 10, each of the terminal voltages for the batteries 11 and 12 gradually increase as the charging nears completion, reach a maximum value when charging is in the region of 90%, and then drop to in the region of 5 to 10 mV lower than this maximum value when the charging is at 100%. This kind of changing terminal voltage for the batteries 11 and 12 flows to the resistors R4 and R5 via the diode D1, where it is divided into the voltage V45 and this divided voltage V45 is sent to the second analog input terminal A/D2.

Changes in the voltage V45 are observed by the charging control circuit 33, which reads the value of this voltage 45 every minute during charging. If the value for this voltage V45 comes down from the maximum value to a value which corresponds with the aforementioned lower voltage, it will be determined that the charging has reached 100%. The port OUT1 is then put to a "0" level, the transistor Q1 is turned off and the charging is rapidly completed. Also, the port OUT2 for the charging control circuit 33 is put to a level "1" and the LED (D2) is extinguished.

By doing things in the above way, the battery device 10 is rapidly charged. Also, the LED (D2) displays that this rapid charging is taking place. As the size of the charging current ICHG is taken to be about 1 CmA the rapid charging is completed in about one hour.

On the other hand, as described above, the performance of the batteries 11 and 12 is inferior if their temperature becomes high during charging so that it becomes necessary that charging is avoided at these times of high temperatures. This is carried out in the following way.

Figure 9:
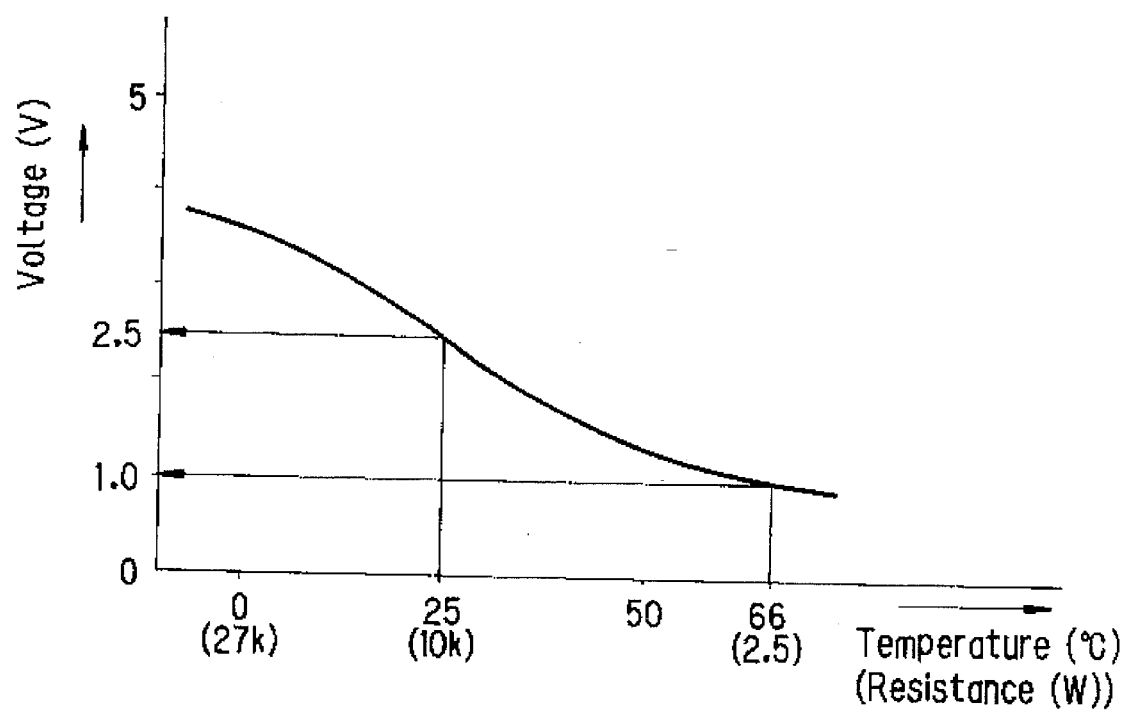
FIG. 9 is a characteristics diagram showing the temperature characteristics of the thermistor taken as the temperature detecting element.

As the thermistor RTH is set up so as to be close to the surface of the outer walls of batteries 11 and 12, if the temperature of battery 11 or 12 increases, as shown in FIG. 9, the resistance decreases, which results in a corresponding decrease in the terminal voltage V27.

When the battery device 10 is charging (and when it starts charging) the terminal voltage V27 is observed by the charging control circuit 33. When the value for the voltage V27 is a value which corresponds to when the temperature of the surface of the external wall of battery 11 or 12 is equal to or exceeds 66° C. (=approx. 1.0 V), i.e. when it drops below a voltage which corresponds to a temperature which is not suitable for charging the batteries 11 and 12, the transistor Q1 is turned off and the charging is halted.

Also, at this time the port OUT2 is changed between a "0" level and a "1" level over a prescribed period and the LED (D2) is made to flash so that the user is made aware that charging is halted due to irregularities.

It follows that when the temperature in at least one of the batteries 11 or 12 increases, the charging of the battery device 10 is halted or not carried out in the first place, so that weakening of battery 11 or 12 is prevented.

So, as the batteries 11 and 12 are grouped together as a single unit in the aforementioned battery device 10, this unit can be used with equipment which requires a comparatively large amount of electrical power.

Also, as the batteries 11 and 12 are arranged the opposite way around within the battery device 10 and the detecting electrodes 15 and 16 are arranged symmetrically about the center of the battery device 10, care does not have to be taken concerning the orientation of the battery device 10 when it is installed in the charging equipment 20 or when it is installed in the equipment with which it is to be used, which makes for easier handling.

Further, if attempts are made to install the battery device 10 in the charging apparatus 20 upside down, this kind of installation will not be possible because of the convex portion 29. The battery device 10 can only be installed when it is installed in the correct manner so that the concave part 19 and the convex part 29 engage with each other. Trouble caused by the connection of the batteries 11 and 12 in reverse polarity can therefore be avoided.

In addition, the weakening of the performance of the batteries 11 and 12 is prevented because the temperature of the batteries 11 and 12 is detected by the thermistor RTH and the charging is stopped if the temperature of the batteries 11 and 12 becomes abnormally high during the charging of the battery device 10, or if the temperature of the batteries 11 and 12 is irregular before the start of charging.

Further, even though there is only one thermistor RTH, it comes into contact with both the battery 11 and the battery 12 and can therefore detect the temperature of both battery 11 and battery 12. This means that it will also detect if only one of the batteries 11 or 12 becomes of an abnormal temperature.

The detecting electrodes 15 and 16 and the terminals 23–28 which connect together the battery device 10 and the charging apparatus 20 are of a simple construction and the terminals 23 to 28 can be soldered directly onto the printed board 22, which keeps the cost down.

Second Embodiment

Figure 12A:
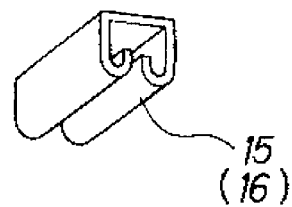
FIGS. 12A to 12C are perspective views showing the structure of the detecting electrodes and terminals where

FIG. 11 is a view of a second embodiment of the battery device 10. Portions which correspond to portions in the first embodiment will be given the same numerals and their detailed description will be omitted. In this example shown in FIG. 11, the detecting electrodes 15 and 16, which are also shown in FIG. 12A, are conductors made from resilient phosphor bronze. These are C-shaped overall, with the inner sides of both ends being bent over so as to form J-shapes.

Figure 12B:
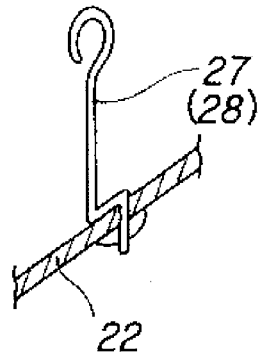
Figure 12C:
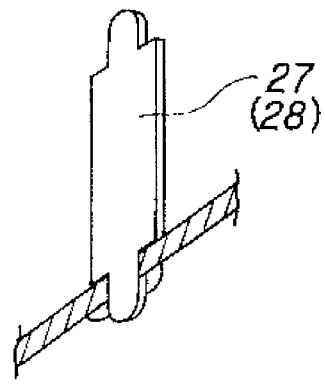
Figure 13:
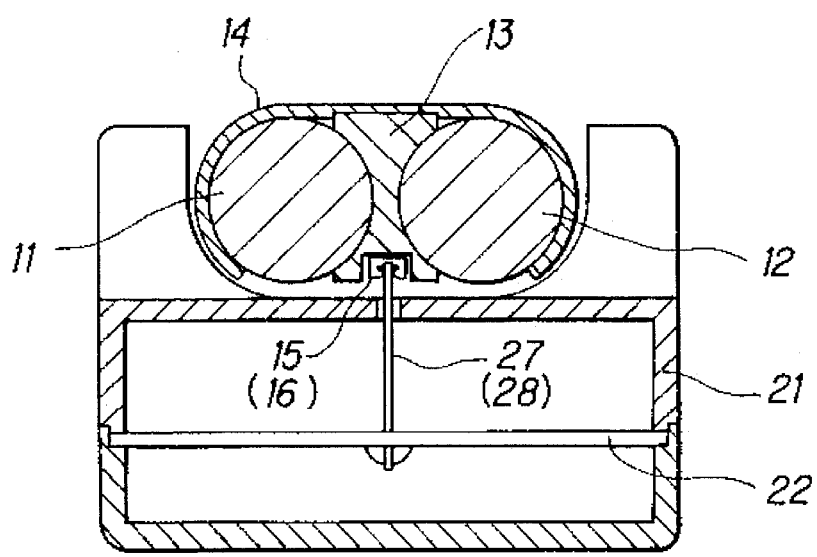
FIG. 13 is a cross-sectional view showing the structure of the charging apparatus for the second embodiment of the present invention.

Then, at the charging apparatus 20, the terminals 27 and 28 which the detecting electrodes 15 and 16 come into contact with are constructed from piano wire coated with conductive plating and bent as shown in FIG. 12B. Alternatively, the terminals 27 and 28 may be constructed from the kind of band-shaped conductor shown in FIG. 12C. They are then soldered to the printed board 22. Therefore, according to this example, when the battery device 10 is installed into the charging apparatus 20, the terminals 27 and 28 slot into the detecting electrodes 15 and 16, as shown in FIG. 13.

As mentioned above, as the charging of the batteries 11 and 12 approaches 100%, the energy for charging is not used for charging, but instead produces heat. Therefore, as shown by the broken line in FIG. 10, as charging approaches 100%, the temperature of the batteries 11 and 12 rises sharply at a rate of 1° to 2° C. per minute.

It follows that the resistance of the thermistor RTH also changes rapidly in accordance with this change in temperature, so that the terminal voltage V27 reduces. The completion of the charging of batteries 11 and 12 is therefore determined by detecting that this voltage V27 has changed. In this case, the completion of the charging can be detected in a more efficient manner if the temperature detection sensitivity of the thermistor RTH is particularly high, i.e., as described previously, the reduction in the voltages at the batteries 11 and 12 at the time of 100% charging is 5 to 10 mV. This is not even one percent of the terminal voltage during charging. It follows that at the charging control circuit 33, when charging of 100% is detected by the change in the divided voltage V45, even if the voltage V45 undergoes a 10 bit A/D conversion, this portion of the voltage V45 only represents the lower three-bit portion and as such is not particularly suitable for detection of completion of charging.

However, by using a thermistor RTH with a high temperature detection sensitivity when detection is being carried out from the change in the temperature at the thermistor RTH, a large proportional change in the terminal voltage V27 at the time of charging completion can be achieved and the detection of the completion of charging can therefore be improved upon.

Figure 14:
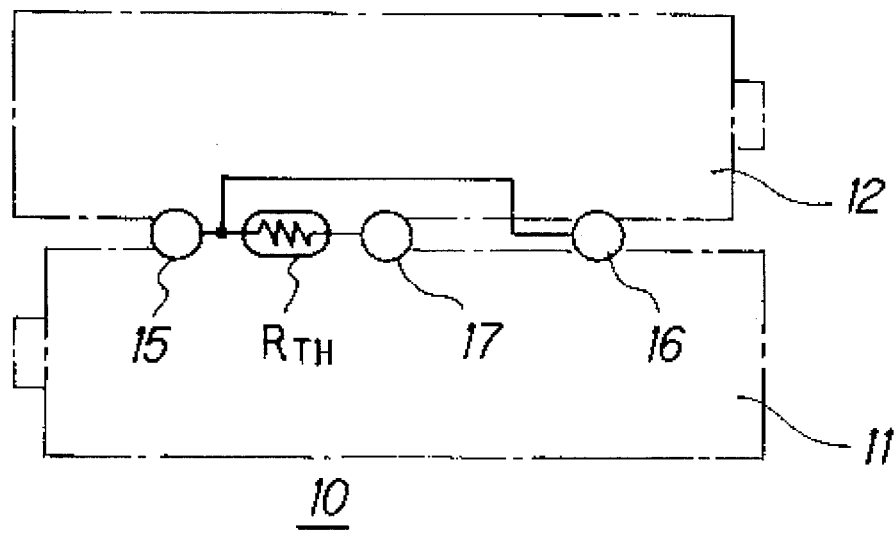
FIG. 14 is a view showing an example of the arrangement of the detecting electrodes.
Figure 15:
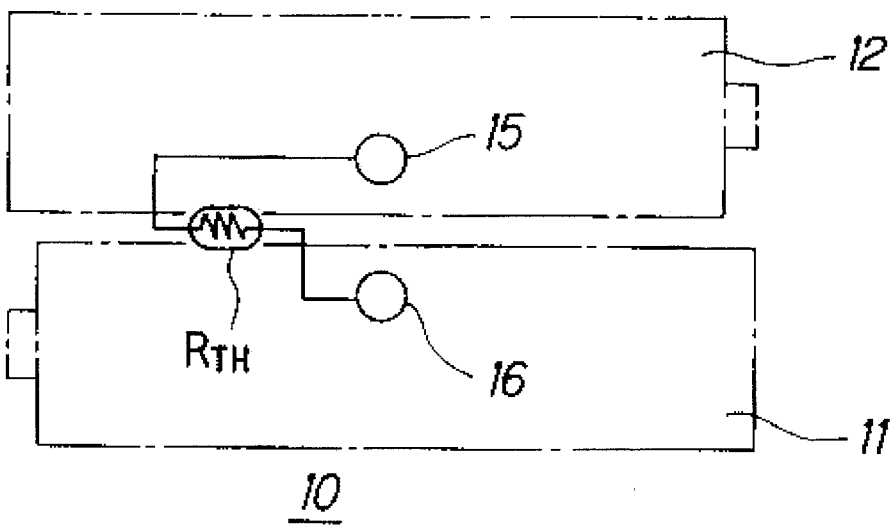
FIG. 15 is a view for describing a further example of an arrangement for the detecting electrodes.

Also, in accordance with the arrangement of the pair of detecting electrodes 15 and 16 described above for the thermistor RTH, a third electrode 17 may also be arranged at the center of the detecting electrodes 15 and 16, so that a thermistor RTH may be connected between the detecting electrodes 15 and 16 and the electrode 17, as shown in FIG. 14. Alternatively, the detecting electrodes 15 and 16 may be on a center line between the batteries 11 and 12 and positioning may be carried out symmetrically with respect to the direction of this arrangement, as shown, for example, in FIG. 15. Further, in the above, the battery device consisted of two batteries 11 and 12 but it may consist of any even number of batteries arranged so as to be positioned in opposite directions.

What is claimed is:

1. A secondary battery device comprising:

an even number of secondary batteries arranged with electrodes facing in mutually opposite directions;

a middle spacer set up between the secondary batteries;

a thermistor set up at the spacer so as to be thermally in contact with the secondary batteries;

a pair of electrodes set up at the middle spacer; and uniting means for uniting the secondary batteries together into a single item, wherein the pair of electrodes is arranged symmetrically about the mechanical center of the secondary batteries and the thermistor is connected to the pair of electrodes, wherein a plurality of concave engaging surfaces for engaging with the external surfaces of the secondary batteries are formed at the middle spacer so as to sandwich the thermistor and the uniting means is further equipped with a flat part which comes into contact with the middle spacer and a plurality of curved arms for supporting the secondary batteries formed together as a single item with the flat part.

2. A secondary battery device according to claim 1, said uniting means being further equipped with a resilient supporting member for supporting the secondary batteries in such a manner as to apply pressure to the exterior of the secondary batteries in the direction of the middle spacer.

3. A secondary battery device according to claims 1, wherein the middle spacer has a concave part formed on the side on which the pair of electrodes are set up.

4. A secondary battery device charging apparatus, said secondary battery device being equipped with an even number of secondary batteries arranged with electrodes facing in mutually opposite directions, a middle spacer positioned between the secondary batteries and structured to support the peripheries of the secondary batteries, a thermistor supported by the middle spacer so as to be thermally in contact with the secondary batteries, a pair of electrodes supported by the middle spacer, and uniting means for uniting the secondary batteries together into a single item, with the pair of electrodes being arranged symmetrically with respect to the mechanical center of the secondary batteries and the thermistor being connected to the pair of electrodes, said apparatus comprising:

a plurality of first terminals which respectively come into contact with the electrodes of the secondary batteries when the secondary battery device is installed;

a pair of second terminals which respectively connect with the pair of electrodes when the secondary battery is installed;

a power supply circuit for supplying charging current to the secondary batteries;

a switching element for controlling the supplying of the charging current outputted from the power supply circuit; and a control circuit, to which the output signal from the thermistor is provided, for controlling the switching element, wherein the plurality of first terminals connect the secondary batteries in series when the secondary battery device is installed, the switching element is turned on by the control circuit so that a charging current from the power supply circuit is supplied via the two first terminals which are positioned at the beginning and the end of the plurality of first terminals in such a manner so as to charge the secondary batteries when the secondary battery device is installed, and the temperature of the secondary batteries is detected from the voltage for the pair of second terminals at the time of charging in such a manner that when the detected temperature is not a suitable temperature for passing a current through the secondary batteries, the switching element is turned off and charging is halted.

5. A secondary battery device charging apparatus according to claim 4, wherein the control circuit senses fluctuations in the terminal voltage of the secondary battery device via the two first terminals positioned at the beginning and the end of the plurality of first terminals when the secondary batteries are being charged, and the switching element is turned off and the charging of the secondary batteries is completed when the secondary battery device terminal voltage exceeds a large value and then drops by a prescribed extent.

6. A secondary battery device charging apparatus according to claim 4, wherein the control circuit turns the switching element off so that the charging of the secondary batteries is completed when the temperature detected by the thermistor while the secondary batteries are being charged exceeds a temperature corresponding to the completion of charging of the secondary battery charging device.

7. A secondary battery device charging apparatus according to claim 4, said pair of second terminals being constructed from a resilient conducting member in such a manner as to come forcibly into contact with each of the pair of electrodes when the secondary batteries are installed.

8. A secondary battery charging apparatus according to claim 4, said pair of second terminals being constructed from a resilient conducting member in such a manner that each electrode of the pair of electrodes is inserted into the conducting member when the secondary battery is installed.

9. A secondary battery device charging apparatus according to claim 4, said apparatus being further equipped with a circuit board for providing distribution to the power supply circuit, the switching element and the control circuit, wherein the pair of terminals are directly attached to the circuit board.

10. A secondary battery device comprising:
an even number of secondary batteries arranged with electrodes facing in mutually opposite directions with the electrodes being arranged in such a manner as to be symmetrical with respect to the center of the device;
uniting means for uniting the secondary batteries together into a single item; and
a temperature detecting element set up at the uniting means so as to be thermally connected to the secondary batteries; and a pair of detecting electrodes set up at the uniting means, wherein the pair of detecting electrodes are arranged symmetrically about the mechanical center of the secondary batteries and the temperature detecting element is connected to the detecting electrodes, wherein a concave part is formed on the side on which the pair of detecting electrodes are set up.

11. A secondary battery device according to claim 10, said uniting means being constructed from a supporting part, positioned on the outside of the secondary batteries, for resiliently supporting and enveloping the secondary batteries and a central part set up between the secondary batteries for deciding the position of the secondary batteries supported by the supporting means and to which the temperature detecting element is attached.

12. A Nickel-Hydrogen battery device charging apparatus, said Nickel-Hydrogen battery device being equipped with an even number of Nickel-Hydrogen batteries, uniting means for uniting the Nickel-Hydrogen batteries in such a manner that the electrodes for pairs of the Nickel-Hydrogen batteries face in mutually opposite directions, a temperature detecting element supported by the uniting means in such a manner as to be thermally connected to the peripheries of the Nickel-Hydrogen batteries and a pair of detecting electrodes set up at the temperature detecting means in such a manner as to be connected with the temperature detecting element, said apparatus comprising:
charging means for charging the installed Nickel-Hydrogen battery device;
a plurality of first terminals for connecting the installed plurality of Nickel-Hydrogen batteries together in series, with the two first terminals positioned at the beginning and the end of the plurality of first terminals providing the charging current from the charging means;
a pair of second terminals connected to the pair of detecting electrodes for the installed Nickel-Cadmium battery device; and control means for controlling the operation of the charging means,
wherein the detection signal from the temperature detecting element is provided to the control means via the pair of second terminals during charging and the control means only charges the Nickel-Hydrogen cells using the charging means when the detection signal indicates that charging is possible.

13. A Nickel-Hydrogen battery device charging apparatus according to claim 12, said control means determining whether or not the Nickel-Hydrogen battery device is installed based on the voltage for the second terminals.

14. A Nickel-Hydrogen battery device charging apparatus according to claim 12, wherein the control means observes the terminal voltage for the Nickel-Hydrogen battery device via the two first terminals which are positioned at the beginning and the end of the plurality of first terminals and halts the charging of the Nickel-Hydrogen battery device by the charging means when it is determined that the terminal voltage for the Nickel-Hydrogen battery device has fallen from a large value to a prescribed value.

15. A Nickel-Hydrogen battery device charging apparatus according to claim 12, said control means being further equipped with a control part to which the detection signal from the second terminals and the terminal voltage from the first terminals is provided, wherein a switching element which is controlled by control signals provided from the control part controls the providing of the charging current from the charging means to the Nickel-Hydrogen battery device based on control signals from the control part.

16. A secondary battery device comprising:
an even number of secondary batteries arranged with electrodes facing in mutually opposite directions;
a middle spacer set up between the secondary batteries; a thermistor set up at the spacer so as to be thermally in contact with the secondary batteries;
a pair of electrodes set up at the middle spacer; and
uniting means for uniting the secondary batteries together into a single item,
wherein the pair of electrodes is arranged symmetrically about the mechanical center of the secondary batteries and the thermistor is connected to the pair of electrodes.

17. A secondary battery device according to claim 16, said uniting means being further equipped with a resilient supporting member for supporting the secondary batteries in such a manner as to apply pressure to the exterior of the secondary batteries in the direction of the middle spacer.

18. A secondary battery device, comprising:
an even number of secondary batteries arranged with electrodes facing in mutually opposite directions;
a middle spacer positioned between the secondary batteries and having engaging concave parts formed at the spacer for engaging outer walls of the secondary batteries;
a thermistor supported by the middle spacer at a location wherein the thermistor is in thermal contact with the secondary batteries;
a pair of electrodes supported by the middle spacer; and
uniting means for uniting the secondary batteries together into a single unit, wherein the thermistor is connected to the pair of electrodes.

19. A secondary battery device as set forth in claim 18, where the pair of electrodes is arranged symmetrically about the mechanical center of the secondary batteries.

20. A secondary battery device as set forth in claim 18 wherein the middle spacer is formed so as to have a concave center so as to appear as a cross-sectional C-shape when viewed along the direction in which the secondary batteries are arranged.

21. A secondary battery device as set forth in claim 20 wherein the middle spacer is of a height which is slightly less than the diameter of the batteries to assist the clamping of the batteries in position by the uniting member.

22. A secondary battery device as set forth in claim 18, wherein the middle spacer includes a through hole formed in the spacer along the direction along which the batteries are arranged, wherein the thermistor in supported in the through hole.

23. A secondary battery device as set forth in claim 20 wherein the electrodes are positioned at equal distances from the lengthwise center of the batteries.

24. A secondary battery device as set forth in claim 18 wherein the electrodes fall within a plane which includes the batteries and are positioned symmetrically about the center of the arrangement of the batteries.

25. A secondary battery device as set forth in claim 18, wherein the uniting member is supported at the periphery of the secondary batteries and formed in a belt shape so as to have a cross-sectional shape of a letter c.

26. A secondary battery device as set forth in claim 18, wherein the uniting member includes a flat part to which the middle spacer is secured, and a pair of C-shaped supporting arms at each end of the flat part, wherein the outer peripheries of the secondary batteries are at least partially encompassed by the united member so as to be clamped therein, and an open side of the uniting member is positioned at the lower side of the battery device.

27. A secondary battery device as set forth in any one of claims 1, 16, or 18, further including a charging apparatus for said battery device comprising:

a plurality of first terminals which respectively come into contact with the electrodes of the secondary batteries when the secondary battery device is installed;

a pair of second terminals which respectively connect with the pair of electrodes when the secondary battery is installed;

a power supply circuit for supplying charging current to the secondary batteries;

a switching element for controlling the supplying of the charging current outputted from the power supply circuit; and control circuit means, to which the output signal from the thermistor is provided, for controlling the switching element, wherein the plurality of first terminals connect the secondary batteries in series when the secondary battery device is installed, for turning on the switching element by the control circuit so that a charging current from the power supply circuit is supplied via the two first terminals which are positioned at the beginning and the end of the plurality of first terminals in such a manner so as to charge the secondary batteries when the secondary battery device is installed, and for detecting the temperature of the secondary batteries from the voltage for the pair of second terminals at the time of charging in such a manner that when the detected temperature is not a suitable temperature for passing a current through the secondary batteries, the switching element is turned off and charging is halted.

* * * * *